US010991056B2

(12) United States Patent
Kubo et al.

(10) Patent No.: US 10,991,056 B2
(45) Date of Patent: Apr. 27, 2021

(54) MENU GENERATION SYSTEM

(71) Applicant: Gurunavi, Inc., Chiyoda-ku (JP)

(72) Inventors: Seiichiro Kubo, Chiyoda-ku (JP); Makito Chiba, Chiyoda-ku (JP); Hiroto Sumida, Chiyoda-ku (JP); Koichiro Nakayama, Chiyoda-ku (JP)

(73) Assignee: Gurunavi, Inc., Chiyoda-ku (JP)

( * ) Notice: Subject to any disclaimer, the term of this patent is extended or adjusted under 35 U.S.C. 154(b) by 122 days.

(21) Appl. No.: 15/515,681

(22) PCT Filed: Sep. 29, 2015

(86) PCT No.: PCT/IB2015/001728
§ 371 (c)(1),
(2) Date: Mar. 30, 2017

(87) PCT Pub. No.: WO2016/051254
PCT Pub. Date: Apr. 7, 2016

(65) Prior Publication Data
US 2017/0301045 A1 Oct. 19, 2017

(30) Foreign Application Priority Data
Sep. 30, 2014 (JP) .............................. JP2014-213139
Jul. 17, 2015 (JP) .............................. JP2015-142779

(51) Int. Cl.
*G06Q 50/12* (2012.01)
*G06F 16/22* (2019.01)

(52) U.S. Cl.
CPC ............ *G06Q 50/12* (2013.01); *G06F 16/22* (2019.01)

(58) Field of Classification Search
CPC ..................... G06Q 50/12; G06F 17/30312
See application file for complete search history.

(56) References Cited

U.S. PATENT DOCUMENTS 6,618,062 B1 * 9/2003 Brown ................... G06Q 30/06
715/810
6,646,659 B1 * 11/2003 Brown ................... G06Q 30/02
715/811

(Continued)

FOREIGN PATENT DOCUMENTS

FR     2 956 497     8/2011
JP     5-151253 A     6/1993

(Continued)

OTHER PUBLICATIONS

Korean Office Action dated Apr. 27, 2018 in Patent Application No. 10-2017-7008490 (with English translation), 11 pages.

(Continued)

*Primary Examiner* — Peter Ludwig
*Assistant Examiner* — Michael Jared Walker
(74) *Attorney, Agent, or Firm* — Oblon, McClelland, Maier & Neustadt, L.L.P.

(57) ABSTRACT

A menu generation system includes a menu item name database that stores a menu item name in multiple languages in association with each menu item ID that determines the menu item name, a property database that stores a menu item property in multiple languages in association with a property ID that determines the menu item property, a menu item database that stores a facility ID that determines a facility, a menu item ID and a property ID in association with one another, and processing circuitry that receives registration of menu item information and that provides menu item information.

17 Claims, 10 Drawing Sheets

(56) References Cited

U.S. PATENT DOCUMENTS

| | | | |
|---|---|---|---|
| 6,859,215 B1* | 2/2005 | Brown | G16H 20/60 715/811 |
| 2002/0095342 A1* | 7/2002 | Feldman | G06Q 30/06 705/15 |
| 2005/0004843 A1* | 1/2005 | Heflin | G06Q 10/08 705/15 |
| 2006/0095331 A1* | 5/2006 | O'Malley | G06F 16/9574 705/22 |
| 2006/0293965 A1* | 12/2006 | Burton | G06Q 30/0635 705/26.81 |
| 2008/0243624 A1* | 10/2008 | Perry | G06F 1/1688 705/15 |
| 2009/0132492 A1* | 5/2009 | Satoh | G06Q 50/12 |
| 2010/0094715 A1* | 4/2010 | Kim | G06Q 30/02 705/15 |
| 2010/0131900 A1* | 5/2010 | Spetalnick | G06F 40/274 715/825 |
| 2012/0323707 A1* | 12/2012 | Urban | G06Q 50/12 705/15 |
| 2013/0211814 A1* | 8/2013 | Derks | G06Q 50/12 704/2 |
| 2013/0300748 A1* | 11/2013 | Yaeda | G06T 11/60 345/467 |
| 2014/0081620 A1* | 3/2014 | Solntseva | G06F 40/58 704/3 |
| 2014/0279294 A1* | 9/2014 | Field-Darragh | H04B 5/0062 705/28 |

FOREIGN PATENT DOCUMENTS

| | | |
|---|---|---|
| JP | 5-324719 A | 12/1993 |
| JP | 10-49185 A | 2/1998 |
| JP | 2002-297733 A | 10/2002 |
| JP | 2009-134588 A | 6/2009 |
| JP | 2013-175062 A | 9/2013 |
| JP | 5422775 B1 | 2/2014 |
| JP | 5449633 B1 | 3/2014 |
| JP | 2015-194857 A | 11/2015 |
| KR | 10-2010-0040069 A | 4/2010 |
| KR | 10-2014-0100208 A | 8/2014 |

OTHER PUBLICATIONS

International Search Report and Written Opinion dated Feb. 11, 2016 in PCT/IB2015/001728 filed Sep. 29, 2015.

Japanese Office Action dated Mar. 10, 2015 in JP 2014-213139 filed Sep. 30, 2014 (with English translation).

Japanese Office Action dated Nov. 10, 2015 in JP 2015-180050 (with English translation).

Korean Office Action dated Feb. 7, 2019 in Korean Patent Application No. 10-2017-7008490 (with English translation), 7 pages.

Office Action dated Jan. 12, 2021 in Japanese Patent Application No. 2017-209883, along with an English translation.

* cited by examiner

FIG. 2

MENU ITEM DATABASE 20

| FACILITY ID (20a) | MENU ITEM ID (20b) | MENU ITEM CATEGORY ID (20c) | INGREDIENT ID (20d) | SEASONING ID (20e) | COOKING STYLE ID (20f) | INTRODUCTION ID (20g) | IMAGE (20h) |
|---|---|---|---|---|---|---|---|
| S001 | M0001 | MJS0111 | FA11,FC20 | TA1,TC10 | TA1 | EA0001 | **.jpeg |
| S001 | M0011 | MJS0200 | FB10,FD01 | TA1,TB10 | TC10 | EA0111 | **.jpeg |
| --- | --- | --- | --- | --- | --- | --- | --- |
| S101 | M0211 | MJS0001 | FF10,FH01 | TA1,TC10 | TB10 | EA0211 | **.jpeg |
| --- | --- | --- | --- | --- | --- | --- | --- |

MENU ITEM DATABASE 21

| MENU ITEM ID (21a) | JAPANESE (21b) | ENGLISH (21c) | CHINESE (SIMPLIFIED) (21d) | CHINESE (TRADITIONAL) (21e) | KOREAN (21f) |
|---|---|---|---|---|---|
| M0001 | カツ丼 KATSUDON | breaded pork cutlet bowl | 水稻炸猪排 | 水稻炸猪排 | 도가스 덥밥 |
| ---- | ---- | ---- | ---- | ---- | ---- |

FIG. 4

PROPERTY (MENU ITEM CATEGORY) DATABASE 22

| MENU ITEM CATEGORY ID (22a) | JAPANESE (22b) | ENGLISH (22c) | CHINESE (SIMPLIFIED) (22d) | CHINESE (TRADITIONAL) (22e) | KOREAN (22f) |
|---|---|---|---|---|---|
| MJS0001 | イタリア料理 | Italian food | 意大利美食 | 義大利料理 | 이탈리아 요리 |
| ---- | ---- | ---- | ---- | ---- | ---- |

FIG. 5

PROPERTY (INGREDIENT) DATABASE 23

| INGREDIENT ID (23a) | JAPANESE (23b) | ENGLISH (23c) | CHINESE (SIMPLIFIED) (23d) | CHINESE (TRADITIONAL) (23e) | KOREAN (23f) |
|---|---|---|---|---|---|
| FA0011 | 牛.肩ロース | Beef: shoulder loin | 牛:肩里脊 | 肩腰肉 | 소 : 알목심 |
| ---- | ---- | ---- | ---- | ---- | ---- |

FIG. 6

PROPERTY (SEASONING) DATABASE 24

| SEASONING ID (24a) | JAPANESE (24b) | ENGLISH (24c) | CHINESE (SIMPLIFIED) (24d) | CHINESE (TRADITIONAL) (24e) | KOREAN (24f) |
|---|---|---|---|---|---|
| TA0011 | 砂糖 | Sugar | 砂糖 | 砂糖 | 설탕 |
| ---- | ---- | ---- | ---- | ---- | ---- |

FIG. 7
PROPERTY (COOKING STYLE) DATABASE 25

| COOKING STYLE ID (25a) | JAPANESE (25b) | ENGLISH (25c) | CHINESE (SIMPLIFIED) (25d) | CHINESE (TRADITIONAL) (25e) | KOREAN (25f) |
|---|---|---|---|---|---|
| TA0101 | 茹でる | Boil | 熬 | 熬 | 포인다 |
| -------- | -------- | -------- | -------- | -------- | -------- |

FIG. 8
INTRODUCTION DATABASE 26

| INTRODUCTION ID (26a) | JAPANESE (26b) | ENGLISH (26c) | CHINESE (SIMPLIFIED) (26d) | CHINESE (TRADITIONAL) (26e) | KOREAN (26f) |
|---|---|---|---|---|---|
| EA01001 | 国産豚… | Pork cutlet… | 炸猪排… | 炸猪排… | 돈까스… |
| -------- | -------- | -------- | -------- | -------- | -------- |

FIG. 12

MENU ITEM COMPONENT INFORMATION DATABASE 28

| MENU ITEM COMPONENT INFORMATION ID (28a) | JAPANESE (28b) | ENGLISH (28c) | CHINESE (SIMPLIFIED) (28d) | CHINESE (TRADITIONAL) (28e) | KOREAN (28f) |
|---|---|---|---|---|---|
| M0001 | カツ丼 KATSUDON | breaded pork cutlet bowl | 水稻炸猪排 | 水稻炸猪排 | 도카스 덮밥 |
| ---- | ---- | ---- | ---- | ---- | ---- |
| TA0011 | 砂糖 | Sugar | 砂糖 | 砂糖 | 설탕 |
| ---- | ---- | ---- | ---- | ---- | ---- |
| TA0101 | 茹でる | Boil | 熬 | 熬 | 끓이다 |
| ---- | ---- | ---- | ---- | ---- | ---- |

FIG. 13

MENU ITEM DATABASE 29

| 29a · MENU ITEM ID | 29b · MENU ITEM CATEGORY ID | 29c · INGREDIENT ID | 29d · SEASONING ID | 29e · COOKING STYLE ID | 29f · INTRODUCTION ID | 29g · IMAGE | 29h · FACILITY ID |
|---|---|---|---|---|---|---|---|
| M0001 | MJS0111 | FA11,FG20 | TA1,TC10 | TA1 | EA0001 | **.jpeg | S101, S102, S103, S104, S105, S106, S107, S108 |
| ------- | ------- | ------- | ------- | ------- | ------- | ------- | ------- |

MENU GENERATION SYSTEM

BACKGROUND OF THE INVENTION

1. Field of the Invention

The invention relates to a menu generation system and, for example, relates to a menu generation system that generates multiple-language menu item information for informing a food menu item to be provided at a facility, such as a restaurant.

2. Description of Related Art

In recent years, foreigners who visit Japan have been increasing, and quite a lot of foreigners come to restaurants. Some restaurants have a menu in a foreign language, such as English, for foreigners. Various systems for introducing food menus to foreigners at shops, such as restaurants, have been suggested so far.

For example, Japanese Patent Application Publication No. 10-49185 (JP 10-49185 A) describes a menu item explanation system that reproduces voice information of a menu item explanation recorded in a recording medium. The menu item explanation system is configured to be able to reproduce voice information of a menu item explanation in a foreign language, and is able to inform menu items by native-language voice to foreigners who do not speak Japanese fluently. In order to utilize this system, each restaurant is required to prepare detailed explanation information. Therefore, if there is no staff who has a good command of the foreign language at a restaurant, it can be difficult to prepare explanations of menu items.

Japanese Patent Application Publication No. 2002-297733 (JP 2002-297733 A) suggests a service support terminal that displays a menu item explanation in English. The service support terminal stores English menu item explanations in advance. When the service support terminal receives a predetermined operation from a staff, the service support terminal displays the English menu item explanations. Even in this case, each restaurant is required to register menu item explanations into the handy terminal in advance as in the case of JP 10-49185 A; however, there is often no staff who has a good command of a foreign language at a restaurant. For this reason, it can be difficult to prepare the menu item explanations.

SUMMARY OF THE INVENTION

In recent years, when foreigners look for restaurants, the foreigners not only use a guide book, or the like, but also often use a website that provides restaurant information on the Internet. The webpages of restaurants found from the website that provides restaurant information provide not only shop names, locations, contact information, and the like, but also information about menu items, and the like. Then, if the webpages of restaurants provide menus in a foreign language, an appeal to foreigners becomes effective. In addition, if such menus are shown to foreigners who actually come to the corresponding restaurants, it is easy for the foreigners to order.

In order to achieve this object, it is conceivable to provide the webpages of restaurants in a foreign language by using an automatic translation site, or the like; however, there is an inconvenience in the accuracy, or the like, of automatic translations when Japanese menus are automatically translated.

Particularly, among customers who visit restaurants, some people restrict acceptable foods depending on the properties of foods, such as ingredients, cooking styles and seasonings, because of the reason of religion, belief (such as vegetarian), health problem (such as allergy), or the like. For this reason, at restaurants, staffs may be required to accurately explain the properties (such as ingredients, cooking styles and seasonings) of menu items (foods) that the restaurants provide, to customers. Particularly, for foreigners who have different food culture and do not understand what a food is like by just looking at menu item names or menu item images, it is important to accurately inform menu item properties (such as ingredients, cooking styles and seasonings) as a menu item explanation.

According to the invention described in JP 10-49185 A or the invention described in JP 2002-297733 A, even when staffs who are in charge of customers do not understand any foreign language, the staffs are allowed to provide foreign-language menu item explanations to the customers. However, the invention described in JP 10-49185 A or the invention described in JP 2002-297733 A requires restaurants to prepare foreign-language menu item explanations and register the menu item explanations into the system, and has such an inconvenience that it is difficult to prepare accurate menu item explanations in a foreign language unless there is no staff who has a good command of the foreign language at a restaurant. In the invention described in JP 10-49185 A or the invention described in JP 2002-297733 A, when the system is intended to be compatible with multiple languages (multiple languages, such as English, Chinese, Korean and Spanish), shops are required to accurately prepare menu item explanations in each language, with the result that enormous amounts of time, effort and cost are required.

As a method of explaining menu items at restaurants to foreigners, a method of automatically translating, at an automatic translation site, or the like, menu item explanations described on webpages that inform the restaurants is also conceivable. However, there is an inconvenience in the accuracy of existing automatic translations, so there is a concern that it is not possible to accurately translate menu item explanations at restaurants. Particularly, there are a large number of menu item properties (such as ingredients, cooking styles and seasonings) specific to countries, and a general automatic translation site may be difficult to accurately translate the menu item properties.

The invention provides a menu generation system that is able to generate a food menu compatible with multiple languages with a simple method even when there is no staff who has a good command of a foreign language.

An aspect of the invention provides a menu generation system that generates menu item information that introduces a food menu item that is provided at a facility. The menu generation system includes a first database, a second database, a menu item database, and a menu item information registration unit. The first database stores a menu item name in multiple languages in association with each menu item ID that determines the menu item name. The second database stores a menu item property in multiple languages in association with a property ID that determines the menu item property. The menu item database stores the menu item ID, a property ID that determines a menu item property of a menu item that is identified by the menu item ID, and a facility ID that determines a facility in association with one another. The menu item information registration unit receives an input of a facility ID from an information terminal, provides the information terminal with the menu item names stored in the first database and the menu item properties stored in the second database in any one of the multiple languages in a selectable state, receives the menu item name and the menu item property selected from among information provided to the information terminal, and stores a menu item ID that determines the received menu item name, a property ID that determines the received menu item property, and the received facility ID in the menu item database in association with one another.

The menu generation system may further include a multilingual menu item information database that stores menu item information in the multiple languages and a facility ID in association with each other. When the menu item information registration unit stores the menu item ID, the property ID and the facility ID in the menu item database in association with one another in response to a request from the information terminal, the menu item information registration unit may generate the multiple-language menu item information of the corresponding facility by using the first and second databases and the menu item database, and may store the generated multiple-language menu item information and the facility ID of the corresponding facility in the multilingual menu item information database in association with each other.

The menu generation system may further include a facility information providing unit. The facility information providing unit, upon reception of information designating a desired facility from a user terminal that is used by a user who utilizes a facility and reception of a menu item providing request with a designated language among the multiple languages, accesses to the multilingual menu item information database, reads menu item information associated with a facility ID that identifies the designated facility in the designated language, and provides the read menu item information to the user terminal.

The menu generation system may further include a facility information providing unit. The facility information providing unit, upon reception of information designating a desired facility from a user terminal that is used by a user who utilizes a facility and reception of a menu item providing request with a designated language among the multiple languages, accesses to the menu item database, reads the menu item ID and the property ID, associated with a facility ID that identifies the designated facility, generates menu item information that a menu item of the designated facility is described in the designated language by using the read menu item ID and property ID and the first and second databases, and provides the generated menu item information to the user terminal.

The first database and the second database may be integrated as a single database. The second database may include an ingredient database that stores an ingredient in multiple languages in association with a property ID that determines the ingredient, a seasoning database that stores a seasoning in multiple languages in association with a property ID that determines the seasoning, and a cooking style database that stores a cooking style in multiple languages in association with a property ID that determines the cooking style.

In this way, in the aspect of the invention, the first and second databases in which pieces of component information (menu item name and menu item property) of each menu item that is allowed to be commonly utilized for each facility are registered in multiple languages are provided. In the aspect of the invention, information that a menu item ID, a property ID and a facility ID are associated with one another is registered as menu item information of each facility. With this configuration, when the menu generation system receives information that identifies a desired facility and a designated desired language, the menu generation system is able to generate menu item information of the desired facility in the desired language by referencing pieces of information (menu item ID and property ID) that determine pieces of component information of a menu item associated with a facility ID and the first and second databases.

With the configuration according to the aspect of the invention, a staff at a facility is allowed to register menu item information compatible with multiple languages into the menu generation system with a simple operation, that is, by selecting pieces of component information (menu item name and menu item property) of each menu item in one language (for example, Japanese), which are provided from the menu generation system. As a result, according to the aspect of the invention, even when there is no staff who has a good command of a foreign language, it is possible to easily generate a menu compatible with multiple languages.

In the aspect of the invention, because the first and second databases in which pieces of component information (menu item name and menu item property) of each menu item are registered in multiple languages are provided in advance, it is possible to accurately provide the menu item property (such as an ingredient, a cooking style and a seasoning) that may not be accurately translated on a general automatic translation site.

According to the aspect of the invention, it is possible to provide a menu generation system that is able to generate a menu compatible with multiple languages with a simple method even when there is no staff who has a good command of a foreign language.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a schematic view that shows a simulated menu item database according to the embodiment of the invention;

FIG. 3 is a view that shows a simulated menu item name database according to the embodiment of the invention;

FIG. 4 is a view that shows a simulated property (menu item category) database according to the embodiment of the invention;

FIG. 5 is a schematic view that shows a simulated property (ingredient) database according to the embodiment of the invention;

FIG. 6 is a schematic view that shows a simulated property (seasoning) database according to the embodiment of the invention;

FIG. 7 is a schematic view that shows a simulated property (cooking style) database according to the embodiment of the invention;

FIG. 8 is a schematic view that shows a simulated introduction database according to the embodiment of the invention;

FIG. 12 is a schematic view that shows a simulated menu item component information database according to an alternative embodiment to the embodiment; and FIG. 13 is a schematic view that shows a menu item database according to an alternative embodiment to the embodiment.

DETAILED DESCRIPTION OF EMBODIMENTS

Hereinafter, an embodiment of the invention will be described with reference to the accompanying drawings. Initially, the configuration of a menu generation system according to the embodiment of the invention will be described with reference to FIG. 1 to FIG. 8.

Figure 1:
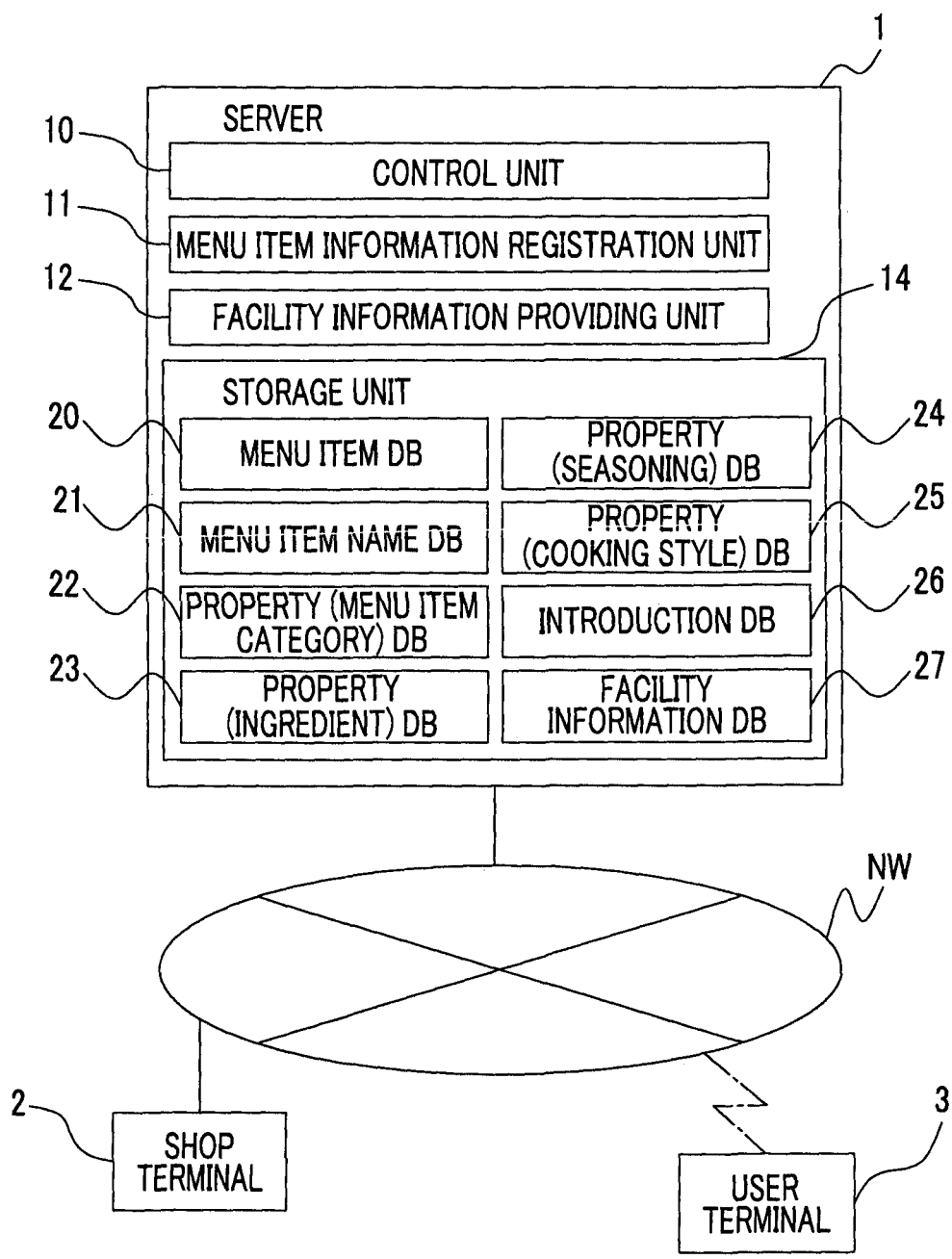
FIG. 1 is a system configuration view of a menu generation system according to an embodiment of the invention.

As shown in FIG. 1, the menu generation system according to the embodiment of the invention includes a server 1. The server 1 generates menu item (food menu item that is provided at a facility) information compatible with multiple languages in response to a request from a shop terminal (information terminal) 2 that a staff, or the like, at a facility, such as a restaurant and a karaoke studio, uses and registers the menu item information, and provides the menu item information compatible with multiple languages to a user terminal 3 that is used by a user who utilizes the facility. The server 1 is connected to a network NW, such as the Internet, and is configured to be able to exchange various data with the shop terminal 2 via the network NW. The server 1 is configured to be able to exchange various data with the user terminal 3 via the network NW. In the embodiment of the invention, the shop terminal 2 is used to register menu item information; however, the shop terminal 2 is only illustrative. For example, an information terminal, such as a staff's personal computer (for example, a personal computer that is used at home) and a smartphone, may be used to register menu item information, and the present embodiment is also applicable to the case where an information terminal other than the shop terminal 2 is used.

The server 1 includes a menu item name database (first database) 21, property databases (second database) 22, 23, 24, 25 and an introduction database (third database) 26. The menu item name database 21 stores (registers) a menu item name in multiple languages in association with each menu item ID that determines a menu item (menu item name). Each of the property databases 22, 23, 24, 25 stores a menu item property (menu item category, ingredient, seasoning, or cooking style) in multiple languages in association with a property ID (menu item category ID, ingredient ID, seasoning ID, or cooking style ID) that determines the menu item property (menu item category, ingredient, seasoning, or cooking style). The introduction database 26 stores a menu item introduction in multiple languages in association with each introduction ID that determines the menu item introduction. The server 1 further includes a menu item database 20 and a facility information database 27. The menu item database 20 is used to register menu items of each facility. The address and contact information of each shop, the introduction of the shop, and the like, are registered in the facility information database 27.

Each of the shop terminal 2 and the user terminal 3 is an information terminal (information terminal, such as a personal computer, a smartphone and a tablet terminal) that includes a control unit, a display unit and an input unit. The control unit has a Web browsing function. The display unit is formed of a liquid crystal display, or the like. The input unit is formed of a keyboard, an operation button, or the like.

The server 1 provides a menu item information registration screen 100 (see FIG. 10) for generating a menu to the shop terminal 2 in response to a request from the shop terminal 2 that a staff at a facility, such as a restaurant and a karaoke studio, operates. The menu item information registration screen 100 is created in a predetermined language (for example, Japanese). The menu item information registration screen 100 is configured to display (for example, display a list of) selectable candidates of each of pieces of predetermined-language (for example, Japanese) information (menu item component information) registered in a corresponding one of the databases 21 to 26 on the menu item information registration screen by an operation from the shop terminal 2. The staff at the facility is allowed to select a menu item name, menu item properties (a menu item category, an ingredient, a seasoning and a cooking style) and a menu item introduction from among corresponding candidates of the pieces of menu item component information, displayed on the menu item information registration screen, by operating the shop terminal 2. The selected pieces of information are transmitted to the server 1.

The server 1 receives the menu item name, the menu item properties (the menu item category, the ingredient, the seasoning and the cooking style) and the menu item introduction, transmitted from the shop terminal 2 at the facility, and stores a menu item ID that determines the received menu item (menu item name), property IDs (a menu item category ID, an ingredient ID, a seasoning ID and a cooking style ID) that determine the received menu item properties, an introduction ID that determines the received menu item introduction in association with a facility ID that determines the corresponding facility in the menu item database 20. Thus, the menu item information of the facility is registered in the server 1.

The server 1 receives a menu item providing request with a designated desired facility and a designated desired language from the user terminal 3, extracts menu item IDs, property IDs (menu item category IDs, ingredient IDs, seasoning IDs, cooking style IDs) and introduction IDs, associated with the received facility ID, from the menu item database 20, generates menu item information of the facility desired by a user in the language desired by the user by using the extracted pieces of information and the above-described databases 21 to 26, and provides the generated menu item information to the user terminal 3.

In this way, the server 1 according to the embodiment of the invention includes the databases 21 to 26 in which pieces of component information (a menu item name, menu item properties and a menu item introduction) of each menu item are registered in multiple languages. When a staff at a facility registers a menu item, the server 1 provides the shop terminal 2 with pieces of component information of the menu item, registered in the databases 21 to 26, in a predetermined language (in a selectable state), and allows the staff to select each of the provided pieces of component information (a menu item name, menu item properties and a menu item introduction). The server 1 registers the menu item information of the facility by storing the received menu item ID, property IDs (menu item category ID, ingredient ID, seasoning ID, cooking style ID) and introduction ID in the menu item database 20 in association with the facility ID. With this configuration, when the server 1 receives information that identifies a desired facility and a designated desired language, the server 1 is able to generate menu item information of the desired facility in the desired language by referencing pieces of information (an menu item ID, property IDs (a menu item category ID, an ingredient ID, a seasoning ID and a cooking style ID), and an introduction ID) that determine pieces of component information of each menu item, associated with the facility ID of the desired facility, and the above-described databases 21 to 26.

That is, according to the embodiment of the invention, a staff at a facility does not need to generate menu item information of the facility for each language. The staff is allowed to register menu item information compatible with multiple languages with a simple operation, that is, by operating the shop terminal 2 to select pieces of component information (a menu item name, menu item properties and a menu item introduction) of a menu item in a predetermined language (for example, Japanese), which are provided from the server 1. As a result, according to the embodiment of the invention, even when there is no staff who has a good command of a foreign language, it is possible to easily generate menu item information compatible with multiple languages. Because the server 1 includes the databases 21 to 26 in which the pieces of component information (a menu item name, menu item properties and a menu item introduction) of a menu item are registered in multiple languages, it is possible to accurately provide the menu item properties (such as an ingredient, a cooking style and a seasoning) that cannot be accurately translated on a general automatic translation site.

Next, the example configuration of the server 1 will be described.

The server 1 includes a control unit 10, a menu item information registration unit 11, a facility information providing unit 12 and a storage unit 14. The menu item database 20, the menu item name database 21, the property (menu item category) database 22, the property (ingredient) database 23, the property (seasoning) database 24, the property (cooking style) database 25, the introduction database 26 and the facility information database 27 are stored in the storage unit 14.

Initially, the configuration of each piece of data stored in the storage unit 14 within the configuration of the server 1 will be described.

As shown in FIG. 2, the menu item database 20 is composed of records (a plurality of records) each including a field 20a, a field 20b, a field 20c, a field 20d, a field 20e, a field 20f, a field 20g and a field 20h. A facility ID that determines a facility, such as a restaurant, is registered in the field 20a. A menu item ID that determines a menu item is registered in the field 20b. A menu item category ID that determines a menu item category is registered in the field 20c. An ingredient ID that determines an ingredient is registered in the field 20d. A seasoning ID that determines a seasoning is registered in the field 20e. A cooking style ID that determines a cooking style is registered in the field 20f. An introduction ID that determines a menu item introduction is registered in the field 20g. A captured image of a menu item is registered in the field 20h.

The facility ID is unique data composed of alphanumeric characters, symbols, and the like, and is allocated to each facility, such as a restaurant. The menu item ID is unique data composed of alphanumeric characters, symbols, and the like, and is allocated to each menu item, such as katsudon and sashimi. The menu item category ID is unique data composed of alphanumeric characters, symbols, and the like, and is allocated to each menu item category (one of properties of a menu item), such as Japanese food and Italian food. The ingredient ID is unique data composed of alphanumeric characters, symbols, and the like, and is allocated to each ingredient (one of properties of a menu item), such as beef and pork, which is used for a menu item. The seasoning ID is unique data composed of alphanumeric characters, symbols, and the like, and is allocated to each seasoning (one of properties of a menu item) that is used in a menu item. The cooking style ID is unique data composed of alphanumeric characters, symbols, and the like, and is allocated to each cooking style (one of properties of a menu item) that is used in a menu item. The introduction ID is unique data composed of alphanumeric characters, symbols, and the like, and is allocated to each menu item menu item introduction.

In a top record 200 in the drawing, a facility ID (S001) is registered in the field 20a, a menu item ID (M0001) that determines a menu item that is provided at a facility that is identified by the facility ID (S001) registered in the field 20a is registered in the field 20b, and a menu item category ID (MJS0111) that determines a menu item category to which a menu item that is identified by the menu item ID (M0001) registered in the field 20b belongs is registered in the field 20c. In the record 200, ingredient IDs (FA11, FC20) that determine ingredients that are used for the menu item that is identified by the menu item ID (M0001) registered in the field 20b are registered in the field 20d, a seasoning ID (TA1) that determines a seasoning that is used for the menu item that is identified by the menu item ID (M0001) registered in the field 20b is registered in the field 20e, and a cooking style ID (TA1) that determines a cooking style of the menu item that is identified by the menu item ID (M0001) registered in the field 20b is registered in the field 20f. In the record 200, an introduction ID (EA0001) that determines a menu item introduction that introduces the menu item that is identified by the menu item ID (M0001) registered in the field 20b is registered in the field 20g, and a captured image of the menu item that is identified by the menu item ID (M0001) is registered in the field 20h.

As shown in FIG. 3, the menu item name database 21 is composed of records (a plurality of records) each including a field 21a, a field 21b, a field 21c, a field 21d, a field 21e and a field 21f. A menu item ID is registered in the field 21a. A Japanese menu item name of a menu item that is identified by the menu item ID registered in the field 21a is registered in the field 21b. An English menu item name of the menu item that is identified by the menu item ID registered in the field 21a is registered in the field 21c. A Chinese (simplified) menu item name of the menu item that is identified by the menu item ID registered in the field 21a is registered in the field 21d. A Chinese (traditional) menu item name of the menu item that is identified by the menu item ID registered in the field 21a is registered in the field 21e. A Korean menu item name of the menu item that is identified by the menu item ID registered in the field 21a is registered in the field 21f.

As shown in FIG. 4, the property (menu item category) database 22 is composed of records (a plurality of records) each including a field 22a, a field 22b, a field 22c, a field 22d, a field 22e and a field 22f. A menu item category ID is registered in the field 22a. Information that a menu item category that is identified by the menu item category ID registered in the field 22a is described in Japanese is registered in the field 22b. Information that the menu item category that is identified by the menu item category ID registered in the field 22a is described in English is registered in the field 22c. Information that the menu item category that is identified by the menu item category ID registered in the field 22a is described in Chinese (simplified) is registered in the field 22d. Information that the menu item category that is identified by the menu item category ID registered in the field 22a is described in Chinese (traditional) is registered in the field 22e. Information that the menu item category that is identified by the menu item category ID registered in the field 22a is described in Korean is registered in the field 22f.

As shown in FIG. 5, the property (ingredient) database 23 is composed of records (a plurality of records) each including a field 23a, a field 23b, a field 23c, a field 23d, a field 23e and a field 23f. An ingredient ID is registered in the field 23a. Information that an ingredient that is identified by the ingredient ID registered in the field 23a is described in Japanese is registered in the field 23b. Information that the ingredient that is identified by the ingredient ID registered in the field 23a is described in English is registered in the field 23c. Information that the ingredient that is identified by the ingredient ID registered in the field 23a is described in Chinese (simplified) is registered in the field 23d. Information that the ingredient that is identified by the ingredient ID registered in the field 23a is described in Chinese (traditional) is registered in the field 23e. Information that the ingredient that is identified by the ingredient ID registered in the field 23a is described in Korean is registered in the field 23f.

As shown in FIG. 6, the property (seasoning) database 24 is composed of records (a plurality of records) each including a field 24a, a field 24b, a field 24c, a field 24d, a field 24e and a field 24f. A seasoning ID is registered in the field 24a. Information that a seasoning that is identified by the seasoning ID registered in the field 24a is described in Japanese is registered in the field 24b. Information that the seasoning that is identified by the seasoning ID registered in the field 24a is described in English is registered in the field 24c. Information that the seasoning that is identified by the seasoning ID registered in the field 24a is described in Chinese (simplified) is registered in field 24d. Information that the seasoning that is identified by the seasoning ID registered in the field 24a is described in Chinese (traditional) is registered in the field 24e. Information that the seasoning that is identified by the seasoning ID registered in the field 24a is described in Korean is registered in the field 24f.

As shown in FIG. 7, the property (cooking style) database 25 is composed of records (a plurality of records) each including a field 25a, a field 25b, a field 25c, a field 25d, a field 25e and a field 25f. A cooking style ID is registered in the field 25a. Information that a cooking style that is identified by the cooking style ID registered in the field 25a is written in Japanese is registered in the field 25b. Information that the cooking style that is identified by the cooking style ID registered in the field 25a is written in English is registered in the field 25c. Information that the cooking style that is identified by the cooking style ID registered in the field 25a is written in Chinese (simplified) is registered in the field 25d. Information that the cooking style that is identified by the cooking style ID registered in the field 25a is written in Chinese (traditional) is registered in the field 25e. Information that the cooking style that is identified by the cooking style ID registered in the field 25a is written in Korean is registered in the field 25f.

As shown in FIG. 8, the introduction database 26 is composed of records (a plurality of records) each including a field 26a, a field 26b, a field 26c, a field 26d, a field 26e and a field 26f. An introduction ID is registered in the field 26a. Information that an introduction that is identified by the introduction ID registered in the field 26a is described in Japanese is registered in the field 26b. Information that the introduction that is identified by the introduction ID registered in the field 26a is described in English is registered in the field 26c. Information that the introduction that is identified by the introduction ID registered in the field 26a is described in Chinese (simplified) is registered in the field 26d. Information that the introduction that is identified by the introduction ID registered in the field 26a is described in Chinese (traditional) is registered in the field 26e. Information that the introduction that is identified by the introduction ID registered in the field 26a is described in Korean is registered in the field 26f.

In the above-described databases 21, 22, 23, 24, 25, 26, the pieces of component information (a menu item name, menu item properties and a menu item introduction) of each menu item are registered in five types of languages (Japanese, English, Chinese (simplified), Chinese (traditional) and Korean); however, the type of language or the number of languages is only illustrative. The type of language or the number of languages in each of the databases 21, 22, 23, 24, 25, 26 is set as needed.

The facility information database 27 is a database in which facility information, such as a facility name, the address and contact information of a facility, the introduction of the facility and the image of the facility, is registered for each facility ID that determines the facility. Although an example configuration of the facility information database 27 is not shown, the facility information is also registered in the types of languages corresponding to those of each of the databases 21, 22, 23, 24, 25, 26.

Next, the functional processing units of the server 1 will be described.

The control unit 10 controls the overall operations of the server 1 and receives various settings to the server 1.

The menu item information registration unit 11 provides the shop terminal 2 with the menu item information registration screen 100 (see FIG. 11) for generating menu item information that a facility, such as a restaurant, provides, in response to a request from the shop terminal 2 at the facility, receives menu item information on the menu item information registration screen 100, and registers the menu item information. A menu item information registration process that is executed by the menu item information registration unit 11 will be described in detail later.

The facility information providing unit 12 is configured to, when the facility information providing unit 12 receives an access request with a designated facility, such as a restaurant, from the user terminal 3, provide the user terminal 3 with a website that introduces the designated facility. When, on the website, the facility information providing unit 12 allows reception of a menu item providing request with a designated language from the user terminal 3 and receives a menu item providing request with a designated language, the facility information providing unit 12 accesses to the menu item database 20 to read the records in which the facility ID that determines the designated facility is registered, generates menu item information that menu items at the facility are described in the designated language by using the information registered in the read records and the databases 21 to 26, and provides the generated menu item information to the user terminal 3.

The hardware configuration of the server 1 is not specifically limited. For example, the server 1 is formed of a single computer or a plurality of computers, including a CPU, an auxiliary storage device, a main storage device, a network interface and input/output interfaces. In this case, programs for implementing the functions of the control unit 10, menu item information registration unit 11 and facility information providing unit 12 are stored in the auxiliary storage device. The above-described storage unit 14 is provided in a predetermined area of the auxiliary storage device. The functions of the control unit 10, menu item information registration unit 11 and facility information providing unit 12 are implemented when the CPU loads the programs stored in the auxiliary storage device onto the main storage device and executes the loaded programs.

Figure 9:
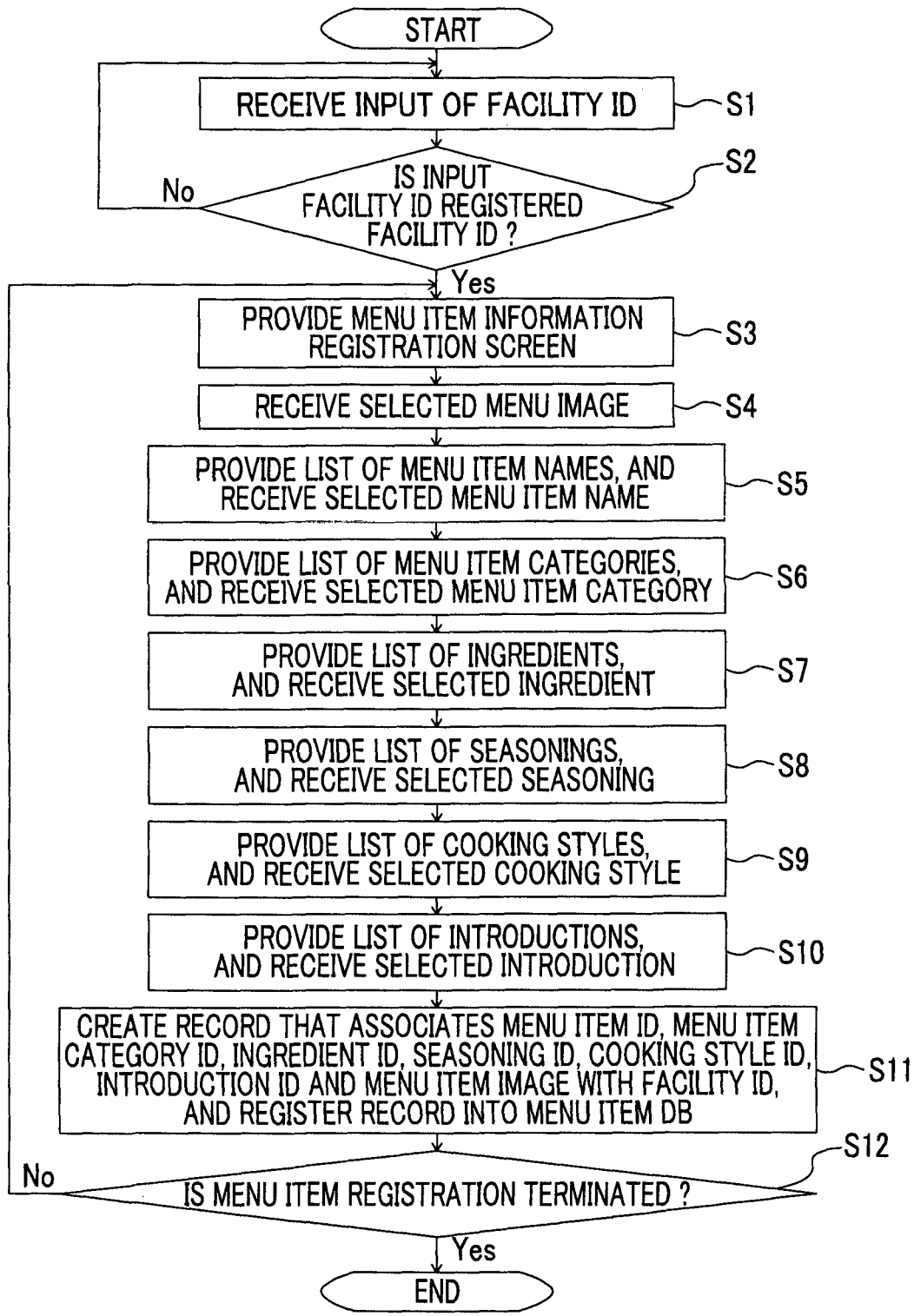
FIG. 9 is a flowchart that shows the procedure of a menu item information registration process that is executed by the menu generation system according to the embodiment of the invention.
Figure 10:
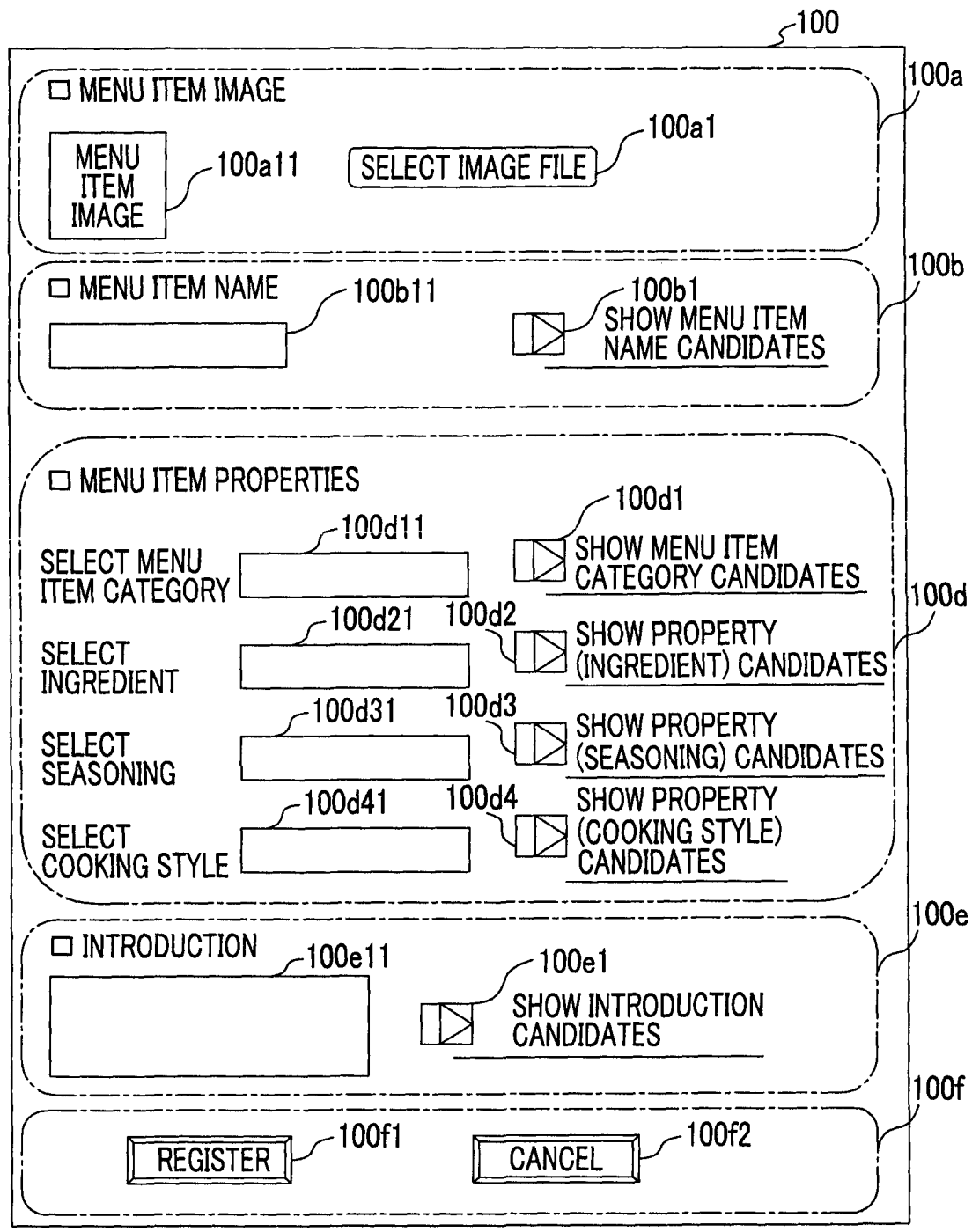
FIG. 10 is a schematic view that shows an example of a menu item information registration screen that is provided by the menu generation system according to the embodiment of the invention.

Next, the menu item information registration process that is executed by the server 1 according to the embodiment of the invention will be described with reference to FIG. 9 and FIG. 10. FIG. 9 is a flowchart that shows the procedure of the menu item information registration process that is executed by the menu generation system according to the embodiment of the invention. FIG. 10 is a schematic view that shows an example of the menu item information registration screen that is provided by the menu generation system according to the embodiment of the invention. In a process prior to execution of the menu item information registration process, it is assumed that a facility ID is allocated to each facility that utilizes the shop terminal 2 and facility information (facility name, the address and contact information of the facility, the introduction of the facility and the image of the facility) associated with the facility ID is registered in the facility information database 27. The menu item information registration process is executed in a predetermined language. Hereinafter, the case where the predetermined language is Japanese will be described as an example.

When a staff at a facility registers a menu item into the server 1, the staff issues an access request to access to the server 1 by operating the shop terminal 2. When the menu item information registration unit 11 of the server 1 receives the access request from the shop terminal 2, the menu item information registration unit 11 provides an authentication screen (not shown) prompting the input of a facility ID to the shop terminal 2. When a facility ID is input from the shop terminal 2, the menu item information registration unit 11 receives the input facility ID, and authenticates the received facility ID (S1, S2). Specifically, when the received facility ID is registered in the facility information database 27, the menu item information registration unit 11 authenticates the input facility ID and proceeds to the process from S3; whereas, when the received facility ID is not registered in the facility information database 27, the menu item information registration unit 11 displays an error message and returns to S1 (or ends the process).

In S3, the menu item information registration unit 11 provides the menu item information registration screen 100 (see FIG. 10) to the shop terminal 2, and then proceeds to the processes of S4 to S11.

The menu item information registration screen 100 will be described with reference to FIG. 10. The menu item information registration screen 100 includes an area 100a, an area 100b, an area 100d, an area 100e and an area 100f. The area 100a is used to receive a selected menu item image. The area 100b is used to receive a selected menu item name. The area 100d is used to receive selected menu item properties (a menu item category, an ingredient, a seasoning and a cooking style). The area 100e is used to receive a selected menu item introduction. The area 100f is used to receive uploading of menu item information.

The area 100a on the menu item information registration screen 100 includes a button 100a1 and an image display area 100a11. The button 100a1 receives a selected image file. When the shop terminal 2 is operated to select (click on) the button 100a1, an image file registered in the shop terminal 2 (or registered in a database on a network connected to the shop terminal 2 or a device, such as a camera) is allowed to be chosen, and the thumbnail of the chosen image file is displayed in the image display area 100a11.

The area 100b on the menu item information registration screen 100 includes a menu item name candidate display button 100b1 and a menu item name display field 100b11. The menu item name candidate display button 100b1 is used to display menu item name candidates from which a menu item name is selected. When the menu item information registration unit 11 receives selection (clicking) of the menu item name candidate display button 100b1, the menu item information registration unit 11 displays predetermined-language (Japanese) menu item names (for example, displays a list of menu item name candidates) registered in the menu item name database 21 on the menu item information registration screen 100 in a selectable state. When the shop terminal 2 is operated to select any one of the menu item names displayed on the screen 100, the selected menu item name is displayed in the display field 100b11.

The area 100d on the menu item information registration screen 100 includes property candidate display buttons 100d1, 100d2, 100d3, 100d4 and display fields 100d11, 100d21, 100d31, 100d41. Each of the property candidate display buttons 100d1, 100d2, 100d3, 100d4 is used to display menu item property candidates from which a corresponding menu item property is selected.

When the menu item information registration unit 11 receives selection of the property (menu item category) candidate display button 100d1, the menu item information registration unit 11 displays predetermined-language (Japanese) menu item categories (for example, displays a list of menu item category candidates) registered in the property (menu item category) database 22 on the menu item information registration screen 100 in a selectable state. When the shop terminal 2 is operated to select any one of the menu item categories displayed in the list, the selected menu item category is displayed in the display field 100d11. When the menu item information registration unit 11 receives selection of the property (ingredient) candidate display button 100d2, the menu item information registration unit 11 displays predetermined-language (Japanese) ingredients (for example, displays a list of ingredient candidates) registered in the property (ingredient) database 23 on the menu item information registration screen 100 in a selectable state. When the shop terminal 2 is operated to select any one of the displayed ingredients, the selected ingredient is displayed in the display field 100d21. When the menu item information registration unit 11 receives selection of the property (seasoning) candidate display button 100d3, the menu item information registration unit 11 displays predetermined-language (Japanese) seasonings (for example, displays a list of seasoning candidates) registered in the property (seasoning) database 24 on the menu item information registration screen 100 in a selectable state. When the shop terminal 2 is operated to select any one of the displayed seasonings, the selected seasoning is displayed in the display field 100d31. When the menu item information registration unit 11 receives selection of the property (cooking style) candidate display button 100d4, the menu item information registration unit 11 displays predetermined-language (Japanese) cooking styles (for example, displays a list of cocking style candidates) registered in the property (cooking style) database 25 on the menu item information registration screen 100 in a selectable state. When the shop terminal 2 is operated to select any one of the cooking styles displayed in the list, the selected cooking style is displayed in the display field 100d41.

The area 100e on the menu item information registration screen 100 includes an introduction candidate display button 100e1 and an introduction display field 100e11. The introduction candidate display button 100e1 is used to display introduction candidates from which an introduction is selected. When the menu item information registration unit 11 receives selection of the introduction candidate display button 100e1, the menu item information registration unit 11 displays predetermined-language (Japanese) introductions (for example, displays a list of introduction candidates) registered in the introduction database 24 on the menu item information registration screen 100 in a selectable state. When the shop terminal 2 is operated to select any one of the displayed introductions, the selected introduction is displayed in the display field 100e11.

The area 100f on the menu item information registration screen 100 includes a registration button 100f1 and a cancellation button 100f2. The registration button 100f1 is used to receive registration of pieces of menu item information (an image file, a menu item name, menu item properties and an introduction) that are respectively selected in the areas 100a, 100b, 100d, 100e. The cancellation button 100f2 is used to cancel the selected menu item information.

Referring back to FIG. 9, the processes of S4 to S11 will be described. The order of the processes of S4 to S10 is not specifically limited, but, for the sake of convenience of description, it is assumed that S4 to S10 are sequentially executed in the following description.

In S4, the menu item information registration unit 11 receives a selected menu item image from the shop terminal 2. Specifically, the menu item information registration unit 11 causes the shop terminal 2 to select a captured image file of a menu item on the menu item information registration screen 100. When the menu item information registration unit 11 receives a selected image from the shop terminal 2, the menu item information registration unit 11 displays the thumbnail of the image file chosen by the shop terminal 2 in the image display area 100a11 of the menu item information registration screen 100 provided to the shop terminal 2.

In S5, the menu item information registration unit 11 receives a selected menu item name from the shop terminal 2. Specifically, when the menu item name candidate display button 100b1 on the menu item information registration screen 100 is selected by the shop terminal 2, the shop terminal 2 issues a menu item name candidate display request to the menu item information registration unit 11. When the menu item information registration unit 11 receives the menu item name candidate display request, the menu item information registration unit 11 reads predetermined-language (Japanese) menu item names from the menu item name database 21. The menu item information registration unit 11 displays (for example, displays a list of) the read predetermined-language (Japanese) menu item names in a selectable state on the menu item information registration screen 100 provided to the shop terminal 2. When the shop terminal 2 is operated to select any one of the displayed menu item names, the menu item information registration unit 11 receives the selected menu item name, and displays the selected menu item name in the display field 100b11 of the menu item information registration screen 100 provided to the shop terminal 2.

In S6, the menu item information registration unit 11 receives a selected menu item category from the shop terminal 2. Specifically, when the property (menu item category) candidate display button 100d1 on the menu item information registration screen 100 is selected by the shop terminal 2, the shop terminal 2 issues a property (menu item category) candidate display request to the menu item information registration unit 11. When the menu item information registration unit 11 receives the property (menu item category) candidate display request, the menu item information registration unit 11 reads predetermined-language (Japanese) menu item categories from the menu item category database 22. The menu item information registration unit 11 displays the read predetermined-language (Japanese) menu item categories in a selectable state on the menu item information registration screen 100 provided to the shop terminal 2. When the shop terminal 2 is operated to select any one of the displayed menu item categories, the menu item information registration unit 11 receives the selected menu item category, and displays the selected menu item category in the display field 100d11 of the menu item information registration screen 100 provided to the shop terminal 2.

In S7, the menu item information registration unit 11 receives a selected ingredient from the shop terminal 2. Specifically, when the property (ingredient) candidate display button 100d2 on the menu item information registration screen 100 is selected by the shop terminal 2, the shop terminal 2 issues a property (ingredient) candidate display request to the menu item information registration unit 11. When the menu item information registration unit 11 receives the property (ingredient) candidate display request, the menu item information registration unit 11 reads predetermined-language (Japanese) ingredients from the property (ingredient) database 23. The menu item information registration unit 11 displays the read predetermined-language (Japanese) ingredients in a selectable state on the menu item information registration screen 100 provided to the shop terminal 2. When the shop terminal 2 is operated to select any one of the displayed ingredients, the menu item information registration unit 11 receives the selected ingredient, and displays the selected ingredient in the display field 100d21 of the menu item information registration screen 100 provided to the shop terminal 2. A plurality of ingredients are selectable.

In S8, the menu item information registration unit 11 receives a selected seasoning from the shop terminal 2. Specifically, when the property (seasoning) candidate display button 100d 3 on the menu item information registration screen 100 is selected by the shop terminal 2, the shop terminal 2 issues a property (seasoning) candidate display request to the menu item information registration unit 11. When the menu item information registration unit 11 receives the property (seasoning) candidate display request, the menu item information registration unit 11 reads predetermined-language (Japanese) seasonings from the property (seasoning) database 24. The menu item information registration unit 11 displays the read predetermined-language (Japanese) seasonings in a selectable state on the menu item information registration screen 100 provided to the shop terminal 2. When the shop terminal 2 is operated to select any one of the displayed seasonings, the menu item information registration unit 11 receives the selected seasoning, and displays the selected seasoning in the display field 100d31 of the menu item information registration screen 100 provided to the shop terminal 2. A plurality of seasonings are selectable.

In S9, the menu item information registration unit 11 receives a selected cooking style from the shop terminal 2. Specifically, when the property (cooking style) candidate display button 100d4 on the menu item information registration screen 100 is selected by the shop terminal 2, the shop terminal 2 issues a property (cooking style) candidate display request to the menu item information registration unit 11. When the menu item information registration unit 11 receives the property (cooking style) candidate display request, the menu item information registration unit 11 reads predetermined-language (Japanese) cooking styles from the property (cooking style) database 25. The menu item information registration unit 11 displays the read predetermined-language (Japanese) cooking styles in a selectable state on the menu item information registration screen 100 provided to the shop terminal 2. When the shop terminal 2 is operated to select any one of the displayed cooking styles, the menu item information registration unit 11 receives the selected cooking style, and displays the selected cooking style in the display field 100d41 of the menu item information registration screen 100 provided to the shop terminal 2. A plurality of cooking styles are selectable.

In S10, the menu item information registration unit 11 receives a selected menu item introduction from the shop terminal 2. Specifically, when the introduction candidate display button 100e1 on the menu item information registration screen 100 is selected by the shop terminal 2, the shop terminal 2 issues a menu item introduction candidate display request to the menu item information registration unit 11. When the menu item information registration unit 11 receives the introduction candidate display request, the menu item information registration unit 11 reads predetermined-language (Japanese) introductions from the introduction database 26. The menu item information registration unit 11 displays the read predetermined-language (Japanese) introductions in a selectable state on the menu item information registration screen 100 provided to the shop terminal 2. When the shop terminal 2 is operated to select any one of the introductions displayed in the list, the menu item information registration unit 11 receives the selected introduction, and displays the selected introduction in the display field 100e11 of the menu item information registration screen 100 provided to the shop terminal 2.

When the pieces of menu item information (the image file, the menu item name, the menu item properties and the introduction) are chosen through the processes of S4 to S10, the menu item information registration unit 11 executes the process of registering the selected pieces of menu item information into the menu item database 20 (S11). Specifically, after the processes of S4 to S10, when the registration button 100f1 on the menu item information registration screen 100 is selected by the shop terminal 2, the shop terminal 2 issues a menu item registration request to the menu item information registration unit 11. When the facility information providing unit 12 receives the menu item registration request, the facility information providing unit 12 generates a record that associates the image file chosen in S4, the menu item ID that determines the menu item name selected in S5, the property IDs (the menu item category ID, the ingredient ID, the seasoning ID and the cooking style ID) that determine the properties (the menu item category, the ingredient, the seasoning and the cooking style) selected in S6 to S9, and the introduction ID that determines the introduction selected in S10, with the facility ID received in S1, and registers the generated record into the menu item database 20. In S11, when the cancellation button 100f2 on the menu item information registration screen 100 is selected by the shop terminal 2, the menu item information registration unit 11 cancels the pieces of menu item information selected in S4 to S10 without registration, and returns to S3.

When the menu item information is registered in the process of S11, the menu item information registration unit 11 provides the shop terminal 2 with an inquiry screen (not shown) as to whether to continue menu item registration, and causes the shop terminal 2 to select whether to continue menu item registration (S12). When the menu item information registration unit 11 receives a request to continue menu item registration from the shop terminal 2, the menu item information registration unit 11 returns to the process of S3. When the menu item information registration unit 11 receives a request to terminate menu item registration from the shop terminal 2, the menu item information registration unit 11 ends the process.

Next, the process of generating menu item information compatible with multiple languages and providing the generated menu item information to the user terminal 3, which is executed by the facility information providing unit 12, will be described.

The facility information providing unit 12 of the server 1 according to the embodiment of the invention provides the user terminal 3 with a website that informs a facility, such as a restaurant, and is able to provide menu item information compatible with multiple languages (Japanese, English, Chinese (simplified), Chinese (traditional), and Korean) on the website.

Specifically, when the facility information providing unit 12 receives an access request with a designated facility, such as a restaurant, from the user terminal 3, the facility information providing unit 12 transmits, to the user terminal 3, a main page (not shown) of the website that introduces the designated facility. Thus, the main page of the website is displayed on the display unit of the user terminal 3.

The main page is created in the predetermined language (Japanese), and is configured to be able to receive selection of a language (English, Chinese (simplified), Chinese (traditional) or Korean) other than Japanese. When a language other than the predetermined language (Japanese) is selected on the main page by the user terminal 3, the user terminal 3 transmits a request to designate the selected language (language designation request) to the facility information providing unit 12. When the facility information providing unit 12 receives the language designation request, the facility information providing unit 12 accesses to the facility information database 27, and generates a facility information page in the language designated by a user by referencing facility information in the designated language within the pieces of information (information, such as facility name and address) of the corresponding facility. The facility information providing unit 12 transmits the generated facility information page to the user terminal 3. Thus, the facility information page (not shown) in the language designated by the user is displayed on the display unit of the user terminal 3.

The facility information page is able to receive a request to provide food menu items to be provided at the facility (menu item providing request). When the menu item providing request is issued by the user terminal 3 on the facility information page, the user terminal 3 issues a menu item providing request with the language used in the facility information page and the designated facility (facility ID) to the facility information providing unit 12. When the facility information providing unit 12 receives the menu item providing request from the user terminal 3, the facility information providing unit 12 executes a menu item information providing process. In the menu item information providing process, the facility information providing unit 12 generates menu item information that menu items of the designated facility are described in the designated language, and provides the generated menu item information to the user terminal 3. Hereinafter, the case where the designated language is English in the menu item information providing process that is executed in the case where the menu item providing request has been received will be described as an example.

When the user terminal 3 issues a menu item providing request with English (and a desired facility) designated to the facility information providing unit 12, the facility information providing unit 12 initially accesses to the menu item database 20, and reads all the records in which the facility ID that determines the designated facility (facility that is informed on the facility information page) is registered.

Subsequently, the facility information providing unit 12 accesses to the menu item name database 21, and extracts an English menu item name associated with the menu item ID registered in the field 20b of each of the read records. The facility information providing unit 12 accesses to the property databases 22, 23, 24, 25, and extracts English menu item properties (menu item category, ingredient, seasoning and cooking style) associated with the menu item property IDs (menu item category ID, ingredient ID, seasoning ID and cooking style ID) respectively registered in the fields 20c, 20d, 20e, 20f of each of the read records. The facility information providing unit 12 accesses to the introduction database 26, and extracts an English introduction associated with the introduction ID registered in the field 20g of each of the read records.

Figure 11:
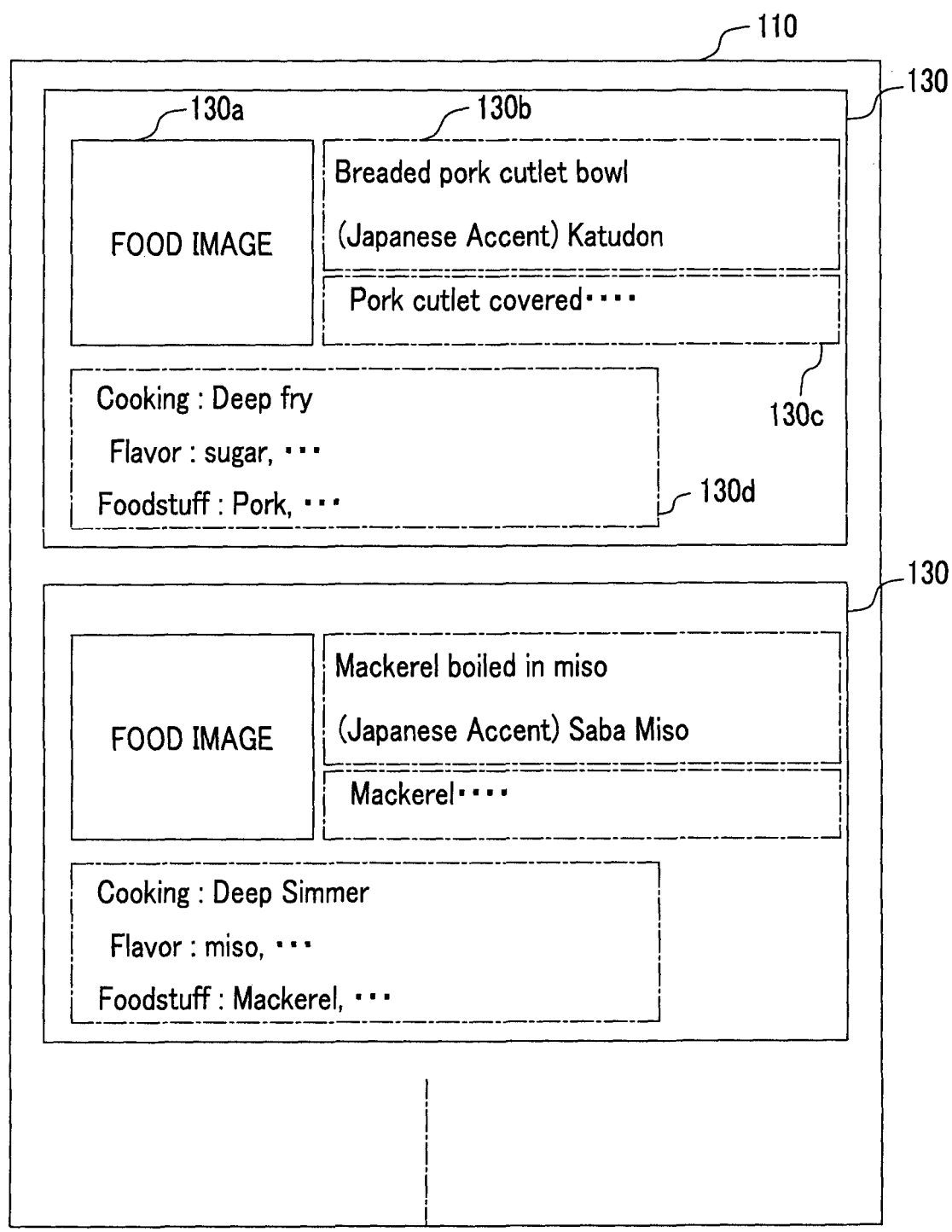
FIG. 11 is a schematic view that shows an example of a menu item information providing screen that is provided by the menu generation system according to the embodiment of the invention.

Subsequently, the facility information providing unit 12 generates menu item information by using an image registered in the field 20h of each of the read records and the corresponding extracted English menu item name, menu item properties (menu item category, ingredient, seasoning and cooking style) and menu item introduction, and transmits the generated menu item information to the user terminal 3. For example, the facility information providing unit 12 generates a menu item information providing screen 110 (see FIG. 11) illustrated in FIG. 11, and transmits the menu item information providing screen 110 to the user terminal 3. Thus, the menu item information providing screen 110 described in English is displayed on the display unit of the user terminal 3. FIG. 11 is a schematic view that shows an example of the menu item information providing screen that is provided by the menu generation system according to the embodiment of the invention.

In the illustrated example, the menu item information providing screen 110 includes a plurality of areas 130 in which menu item information is displayed. Each display area 130 includes a display area 130a for a menu item image, a display area 130b for an English menu item name, a display area 130c for an English introduction and a display area 130d for English menu item properties (ingredient, seasoning and cooking style). Chinese (simplified) menu item information, Chinese (traditional) menu item information and Korean menu item information are also generated in a similar procedure to that of the English one. In the drawing, a menu item category is not shown, but the menu item category is, for example, displayed in the area 130c or the area 130d.

Japanese menu item information is received on the above-described main page. That is, when the user terminal 3 issues a menu item providing request on the main page, the user terminal 3 issues a menu item providing request with Japanese and the facility (facility ID) designated to the facility information providing unit 12. Japanese menu item information is also generated in a similar procedure to that of the above-described English one, and is transmitted to the user terminal 3.

In this way, according to the embodiment of the invention, a staff at a facility is able to generate menu item information compatible with multiple languages and register the generated menu item information into the server 1 with a simple operation, that is, by operating the shop terminal 2 to select pieces of component information (a menu item name, menu item properties and a menu item introduction) of a menu item in one language (for example, Japanese), which are provided from the server 1. As a result, according to the embodiment of the invention, even when there is no staff who has a good command of a foreign language, it is possible to generate menu item information compatible with multiple languages with a simple method.

In the embodiment of the invention, because the server 1 includes in advance the databases 21 to 26 in which the pieces of component information (a menu item name, menu item properties and a menu item introduction) of each menu item are registered in multiple languages, it is possible to accurately provide the menu item properties (such as the ingredient, the cooking style and the seasoning) that may not be accurately translated on a general automatic translation site.

In the embodiment of the invention, the databases 21 to 26 in which pieces of component information of each menu item that is allowed to be commonly utilized for each facility are registered in multiple languages are provided, and identification information that determines each of the pieces of component information of each menu item is registered as menu item information of each facility. With this configuration, because it is not required to generate menu item information for each facility and each language or store menu item information for each facility and each language, a burden on menu generation work at a shop is reduced, and a load on the hardware resources of the system is reduced.

As described above, according to the embodiment of the invention, it is possible to provide a menu generation system that is able to generate a menu compatible with multiple languages with a simple method even when there is no staff who has a good command of a foreign language.

The above-described embodiment may be modified into various forms within the scope of the invention.

For example, in the above-described embodiment, menu item information is composed of a menu item name, menu item properties (a menu item category, an ingredient, a seasoning and a cooking style), a menu item introduction and a captured image of a menu item; however, menu item information is not specifically limited to this configuration. For example, menu item information does not need to include an image, and may be composed of a menu item name, menu item properties (a menu item category, an ingredient, a seasoning and a cooking style). Alternatively, menu item properties do not need to include a menu item category, and may include only an ingredient, a seasoning and a cooking style. Menu item properties may include any one or more of an ingredient, a seasoning and a cooking style.

In the above-described embodiment, a menu item name may be selected from the menu item name database 21, and a menu item category is further selected from the database 22. Instead, a menu item name may be selected by way of a menu item category. In this case, it is desirable that menu item categories be configured into a hierarchical structure consisting of, for example, a large classification "Japanese food", a middle classification "sashimi" and a small classification "sashimi of tuna". Of course, the hierarchical structure may consist of a large classification and a middle classification.

In the above-described embodiment, each of pieces of component information (a menu item name, menu item properties (a menu item category, an ingredient, a seasoning and a cooking style) and a menu item introduction) of each menu item is selected from the information registered in the databases 21 to 26. Instead, for the purpose of improving user's convenience, at the time when a menu item name is selected, menu item properties (a menu item category, an ingredient, a seasoning and a cooking style) and a menu item introduction may be initially temporarily selected. In this case, the menu item database 20 needs to store an ingredient, a seasoning, a cooking style and a menu item introduction (only the IDs of them are required) that are generally used for each individual menu item. When there is any change, a user is allowed to correct, add or delete the temporarily selected one of menu item properties (a menu item category, an ingredient, a seasoning and a cooking style) or a menu item introduction.

In the above-described embodiment, each of pieces of component information (a menu item name, menu item properties (a menu item category, an ingredient, a seasoning and a cooking style) and a menu item introduction) of each menu item is selected from the information registered in the databases 21 to 26; however, each of pieces of component information is not specifically limited to this configuration. For pieces of component information of each menu item, the menu item information registration unit 11 may receive arbitrary information (text information) from the shop terminal 2. In this case, the menu item information registration unit 11 is provided with a translation function in advance, identification information is allocated to arbitrary text information, the arbitrary text information is translated by the use of the translation function, and then the translated arbitrary text information is registered into the corresponding database. For example, when a Japanese menu item name that is not registered in the menu item name database 21 is input, the menu item information registration unit 11 translates the Japanese menu item name into foreign languages (English, Chinese (simplified), Chinese (traditional) and Korean) with the use of the translation function. The menu item information registration unit 11 allocates a menu item ID to the input Japanese menu item name, and registers the input Japanese menu item name and the translated foreign-language menu item names into the menu item name database 21 in association with the menu item ID.

In each of the databases 21 to 26, registered information may be classified into a hierarchical structure, and may be displayed in a list by hierarchy.

In the above-described embodiment, the plurality of databases 21 to 26 are provided in order to register pieces of component information (a menu item name, menu item properties and a menu item introduction) of each menu item; however, the invention is not specifically limited to this configuration. For example, instead of the databases 21 to 26, only one menu item component information database 28 illustrated in FIG. 12 may be provided in the storage unit 14 of the server 1. FIG. 12 is a schematic view that shows a simulated menu item component information database according to an alternative embodiment to the embodiment of the invention.

As shown in the drawing, the menu item component information database 28 is composed of records (a plurality of records) each including a field 28*a*, a field 28*b*, a field 28*c*, a field 28*d*, a field 28*e* and a field 28*f*. An ID that determines each of pieces of menu item component information (a menu item name, menu item properties and a menu item introduction) is registered in the field 28*a*. Information that menu item component information that is identified by the menu item component information ID registered in the field 28*a* is described in Japanese is registered in the field 28*b*. Information that the menu item component information that is identified by the menu item component information ID registered in the field 28*a* is described in English is registered in the field 28*c*. Information that the menu item component information that is identified by the menu item component information ID registered in the field 28*a* is described in Chinese (simplified) is registered in the field 28*d*. Information that the menu item component information that is identified by the menu item component information ID registered in the field 28*a* is described in Chinese (traditional) is registered in the field 28*e*. Information that the menu item component information that is identified by the menu item component information ID registered in the field 28*a* is described in Korean is registered in the field 28*f*. With this configuration, it is possible to manage menu item component information with a single database.

The configuration of each of the above-described databases 21 to 26 is set as needed. For example, the property databases 22, 23, 24, 25 may be integrated as a single database.

In the above-described embodiment, pieces of identification information (a menu item ID, menu item property IDs and a menu item introduction ID) that determine pieces of component information of each menu item, and the like, are registered in the menu item database 20 in advance, and, when the user terminal 3 issues a menu item providing request with a designated language and facility (facility ID), menu item information in the corresponding language is generated by using the menu item database 20 and the databases 21 to 26 in which the menu item component information is registered, and the menu item information is provided to the user terminal 3; however, the invention is not specifically limited to this configuration.

For example, a multilingual menu item information database (not shown) that stores menu item information generated in multiple languages (Japanese, English, Chinese (simplified), Chinese (traditional) and Korean) for each facility is provided in the storage unit 14 of the server 1 in advance. When the menu item information registration unit 11 has registered new information into the menu item database 20 in S11 of FIG. 9, the menu item information registration unit 11 may generate the multiple-language menu item information of the corresponding facility by using the menu item database 20 and the databases 21 to 26, and may register the generated multiple-language menu item information into the multilingual menu item information database. In this case, when the user terminal 3 issues a menu item providing request with a designated facility (facility ID) and language displayed on a facility information page to the facility information providing unit 12, the facility information providing unit 12 reads menu item information of the corresponding language and facility (facility ID) from the multilingual menu item information database, and provides the read menu item information to the user terminal 3. In this way, by registering multiple-language (Japanese, English, Chinese (simplified), Chinese (traditional) and Korean) menu item information of each facility, when a menu item providing request with a designated language and facility (facility ID) is received from the user terminal 3, menu item information is quickly provided to the user terminal 3.

The menu item information registration unit 11 is able to change or delete information registered in the menu item database 20 in response to a request from the shop terminal 2. When the menu item information registration unit 11 has changed information registered in the menu item database 20 in response to a request from the shop terminal 2, the menu item information registration unit 11 changes corresponding menu item information registered in the multilingual menu item information database. When the menu item information registration unit 11 has deleted information registered in the menu item database 20 in response to a request from the shop terminal 2, the menu item information registration unit 11 deletes corresponding menu item information registered in the multilingual menu item information database.

In the menu item database 20 according to the above-described embodiment, a menu item ID, property IDs (a menu item category ID, an ingredient ID, a seasoning ID and a cooking style ID), an introduction ID and an image are registered in association with a facility ID; however, the invention is not specifically limited to this configuration. Instead of the menu item database 20, a menu item database 29 shown in FIG. 13 may be used. FIG. 13 is a schematic view that shows an alternative embodiment to the menu item database according to the embodiment of the invention.

The illustrated menu item database 29 stores property IDs (a menu item category ID, an ingredient ID, a seasoning ID and a cooking style ID), an introduction ID, an image and a facility ID in association with a menu item ID, and is configured to be able to efficiently manage data when menu items common to a plurality of shops (facilities) are provided.

Specifically, the menu item database 29 is composed of records (a plurality of records) each including a field 29a, a field 29b, a field 29c, a field 29d, a field 29e, a field 29f, a field 29g and a field 29h. A menu item ID is registered in the field 29a. A menu item category ID is registered in the field 29b. An ingredient ID is registered in the field 29c. A seasoning ID is registered in the field 29d. A cooking style ID is registered in the field 29e. An introduction ID is registered in the field 20f. A captured image of each menu item is registered in the field 29g. A facility ID is registered in the field 29h. A plurality of facility IDs are allowed to be registered in the field 29h. With this configuration, in a case where the same menu item is provided at a plurality of shops, such as chain stores, it is possible to reduce the number of records that are registered in the menu item database 29, so it is possible to efficiently manage data.

The server 1 may hold model data of each menu item (model data that associates a menu item category ID, property IDs, an introduction ID and a model image with one another for each menu item ID). In this case, the shop terminal 2 is caused to select a menu item name first, and, for pieces of component information other than the menu item name, displays component information of model data in which the selected menu item name is registered or information similar to component information of the model data at a higher rank in a list.

Each of the above-described databases 20 to 26 has a table format data structure; however, this is only illustrative. The structure of each of the databases 20 to 26 may be any structure.

In the menu item database 20 shown in FIG. 2 according to the above-described embodiment, a menu item ID, property IDs (a menu item category ID, an ingredient ID, a seasoning ID and a cooking style ID), an introduction ID and an image are stored in association with a facility ID; however, actually, any information may be associated with any information. In addition, a data configuration that all the pieces of information are pooled in the server is applicable.

The invention claimed is:

1. A menu generation system, the menu generation system comprising:
processing circuitry programmed to:
store, in a first database:
menu item names including:
a plurality of first menu item names in a first language, and
for each of the first menu item names, a plurality of corresponding menu item names each being a different translation of the first menu item name in one of multiple languages other than the first language, and
a plurality of menu item identifiers (IDs), each of the menu item IDs being associated with one of the first menu item names and the corresponding menu item names of the one of the first menu item names, store, in a second database:
menu item properties including:
a plurality of first menu item properties in the first language, and
for each of the first menu item properties, a plurality of corresponding menu item properties each being a different translation of the first menu item property in the one of the multiple languages, and
a plurality of property IDs, each of the property IDs being associated with one of the first menu item properties and the corresponding menu item properties of the one of first menu item properties,
receive an input of a facility identifier (ID) from an information terminal, the facility ID identifying an establishment that serves food,
in response to receipt of the input of the facility ID:
provide the information terminal with a plurality of the menu item names read from the first database and each in a same predetermined language, the predetermined language being one of the first language and the multiple languages, and
provide the information terminal with a plurality of the menu item properties read from the second database and each in the same predetermined language,
receive, from the information terminal, a selected menu item name selected from among the plurality of the menu item names provided to the information terminal,
receive, from the information terminal, a selected menu item property selected from among the plurality of the menu item properties provided to the information terminal,
in response to receipt of the selected menu item name and the selected menu item property, generate a record in a menu item database, the record including (1) a menu item ID from among the menu item IDs and corresponding to the selected menu item name, (2) a property ID from among the property IDs and corresponding to the selected menu item property, and (3) the facility ID stored in association with one another, receive information designating a facility corresponding to the facility ID from a user terminal that is used by a user who utilizes the facility, receive a menu item providing request with a designated language among the multiple languages and the first language, and in response to receipt of the information designating the facility and the menu item providing request:
  access the menu item database,
  read the menu item ID associated with the facility ID from the menu item database,
  read the property ID associated with the facility ID from the menu item database,
  generate menu item information where the menu item of the facility is described in the designated language using the read menu item ID, the read property ID, the first database, and the second database, and
  provide the generated menu item information to the user terminal, wherein the second database includes:

an ingredient database that stores:
  ingredients including:
    a plurality of first ingredients in the first language, and
    for each of the first ingredients, a plurality of corresponding ingredients each being a different translation of the first ingredient in the one of the multiple languages, and
  a plurality of ingredient IDs, each of the ingredient IDs being associated with one of the first ingredients and the corresponding ingredients of the one of the first ingredients, a seasoning database that stores:
  seasonings including:
    a plurality of first seasonings in the first language, and
    for each of the first seasonings, a plurality of corresponding seasonings each being a different translation of the first seasoning in the one of the multiple languages, and
  a plurality of seasoning IDs, each of the seasoning IDs being associated with one of the first seasonings and the corresponding seasonings of the one of the first seasonings, and a cooking style database that stores:
  cooking styles including:
    a plurality of first cooking styles in the first language, and
    for each of the first cooking styles, a plurality of corresponding cooking styles each being a different translation of the first cooking style in the one of the multiple languages, and
  a plurality of cooking style IDs, each of the cooking style IDs being associated with one of the first cooking styles and the corresponding cooking styles of the one of the first cooking styles.

2. The menu generation system according to claim 1, wherein the processing circuitry is further programmed to:
  generate multiple-language menu item information of a facility corresponding to the facility ID using the first database, the second database, and the menu item database, and
  store the generated multiple-language menu item information and the facility ID in association with each other in a multilingual menu item information database.

3. The menu generation system according to claim 2, wherein the processing circuitry is further programmed to:
  in response to receipt of the information designating the facility and the menu item providing request:
    access the multilingual menu item information database,
    read menu item information associated with the facility ID in the designated language from the multilingual menu item information database, and
    provide the read menu item information to the user terminal.

4. The menu generation system according to claim 1, wherein the first database and the second database are integrated as a single database.

5. The menu generation system according to claim 1, wherein the processing circuitry is further programmed to:
  store, in a third database:
    menu item introductions including:
      a plurality of first menu item introductions in the first language, and
      for each of the first menu item introductions, a plurality of corresponding menu item introductions each being a different translation of the first menu item introduction in the one of the multiple languages, and
    a plurality of introduction IDs, each of the introduction IDs being associated with one of the first menu item introductions and the corresponding menu item introductions of the one of the first menu item introductions,
  in response to receipt of the facility ID, provide the information terminal with the plurality of the menu item names read from the first database, the plurality of the menu item properties read from the second database, and a plurality of the menu item introductions read from the third database and each in the same predetermined language,
  receive, from the information terminal, the selected menu item name, the selected menu item property, and a selected menu item introduction selected from among the plurality of the menu item introductions provided to the information terminal, and
  in response to receipt of the selected menu item name, the selected menu item property, and the selected menu item introduction, generate the record in the menu item database, the record including (1) the menu item ID from among the menu item IDs and corresponding to the selected menu item name, (2) the property ID from among the property IDs and corresponding to the selected menu item property, (3) the facility ID, and (4) an introduction ID from among the introduction IDs and corresponding to the selected menu item introduction stored in association with one another.

6. The menu generation system according to claim 5, wherein the processing circuitry is further programmed to:
  generate multiple-language menu item information of a facility corresponding to the facility ID using the first database, the second database, the third database, and the menu item database, and
  store the generated multiple-language menu item information and the facility ID in association with each other in a multilingual menu item information database.

7. The menu generation system according to claim 6, wherein the processing circuitry is further programmed to:
in response to receipt of the information designating the facility and the menu item providing request:
access the multilingual menu item information database,
read menu item information associated with the facility ID in the designated language from the multilingual menu item information database, and
provide the read menu item information to the user terminal.

8. The menu generation system according to claim 5, wherein the processing circuitry is further programmed to:
in response to receipt of the information designating the facility and the menu item providing request:
access the menu item database,
read the menu item ID associated with the facility ID from the menu item database,
read the property ID associated with the facility ID from the menu item database,
read the introduction ID associated with the facility ID from the menu item database
generate menu item information where the menu item of the facility is described in the designated language using the read menu item ID, the read property ID, the read introduction ID, the first database, the second database, and third database, and
provide the generated menu item information to the user terminal.

9. The menu generation system according to claim 5, wherein the first database, the second database, and the third database are integrated as a single database.

10. A menu generation method, the method comprising:
storing, in a first database:
menu item names including:
a plurality of first menu item names in a first language, and
for each of the first menu item names, a plurality of corresponding menu item names each being a different translation of the first menu item name in one of multiple languages other than the first language, and
a plurality of menu item identifiers (IDs), each of the menu item IDs being associated with one of the first menu item names and the corresponding menu item names of the one of the first menu item names,
storing, in a second database:
menu item properties including:
a plurality of first menu item properties in the first language,
for each of the first menu item properties, a plurality of corresponding menu item properties each being a different translation of the first menu item property in the one of the multiple languages, and
a plurality of property IDs, each of the property IDs being associated with one of the first menu item properties and the corresponding menu item properties of the one of the first menu item properties,
receiving an input of a facility identifier (ID) from an information terminal, the facility ID identifying an establishment that serves food,
in response to receipt of the input of the facility ID:
providing the information terminal with a plurality of the menu item names read from the first database and each in a same predetermined language, the predetermined language being one of the first language and the multiple languages, and
providing the information terminal with a plurality of the menu item properties read from the second database and each in the same predetermined language,
receiving, from the information terminal, a selected menu item name selected from among the plurality of the menu item names provided to the information terminal,
receiving, from the information terminal, a selected menu item property selected from among the plurality of the menu item properties provided to the information terminal,
in response to receipt of the selected menu item name and the selected menu item property, generating a record in a menu item database, the record including (1) a menu item ID from among the menu item IDs and corresponding to the selected menu item name, (2) a property ID from among the property IDs and corresponding to the selected menu item property, and (3) the facility ID stored in association with one another,
receiving information designating a facility corresponding to the facility ID from a user terminal that is used by a user who utilizes the facility,
receiving a menu item providing request with a designated language among the multiple languages and the first language, and
in response to receipt of the information designating the facility and the menu item providing request:
accessing the menu item database,
reading the menu item ID associated with the facility ID from the menu item database,
reading the property ID associated with the facility ID from the menu item database,
generating menu item information where the menu item of the facility is described in the designated language using the read menu item ID, the read property ID, the first database, and the second database, and
providing the generated menu item information to the user terminal,
wherein the second database includes:
an ingredient database that stores:
ingredients including:
a plurality of first ingredients in the first language, and
for each of the first ingredients, a plurality of corresponding ingredients each being a different translation of the first ingredient in the one of the multiple languages, and
a plurality of ingredient IDs, each of the ingredient IDs being associated with one of the first ingredients and the corresponding ingredients of the one of the first ingredients,
a seasoning database that stores:
seasonings including:
a plurality of first seasonings in the first language, and
for each of the first seasonings, a plurality of corresponding seasonings each being a different translation of the first seasoning in the one of the multiple languages, and
a plurality of seasoning IDs, each of the seasoning IDs being associated with one of the first seasonings and the corresponding seasonings of the one of the first seasonings, and a cooking style database that stores:
  cooking styles including:
    a plurality of first cooking styles in the first language, and
    for each of the first cooking styles, a plurality of corresponding cooking styles each being a different translation of the first cooking style in the one of the multiple languages, and
  a plurality of cooking style IDs, each of the cooking style IDs being associated with one of the first cooking styles and the corresponding cooking styles of the one of the first cooking styles.

11. The menu generation method according to claim 10, further comprising:
  generating multiple-language menu item information of a facility corresponding to the facility ID using the first database, the second database, and the menu item database, and
  storing the generated multiple-language menu item information and the facility ID in association with each other in a multilingual menu item information database.

12. The menu generation method according to claim 11, further comprising:
  receiving a menu item providing request with a designated language among the multiple languages and the first language, and
  in response to receipt of the information designating the facility and the menu item providing request:
    accessing the multilingual menu item information database,
    reading menu item information associated with the facility ID from the multilingual menu item information database, and
    providing the read menu item information to the user terminal.

13. The menu generation method according to claim 10, wherein the first database and the second database are integrated as a single database.

14. The menu generation system according to claim 1, wherein the record in the menu item database includes the menu item ID stored in association with a plurality of different facility IDs.

15. The menu generation system according to claim 1, wherein at least two of the ingredient database, the seasoning database, and the cooking style database are separate from one another.

16. The menu generation system according to claim 4, wherein first database and the second database are separate from the menu item database.

17. The menu generation system according to claim 1, wherein the processing circuitry is configured to store only IDs in the menu item database.

* * * * *